Jan. 14, 1930.  G. H. SAMLOW  1,743,571
FEEDER
Filed Sept. 26, 1928
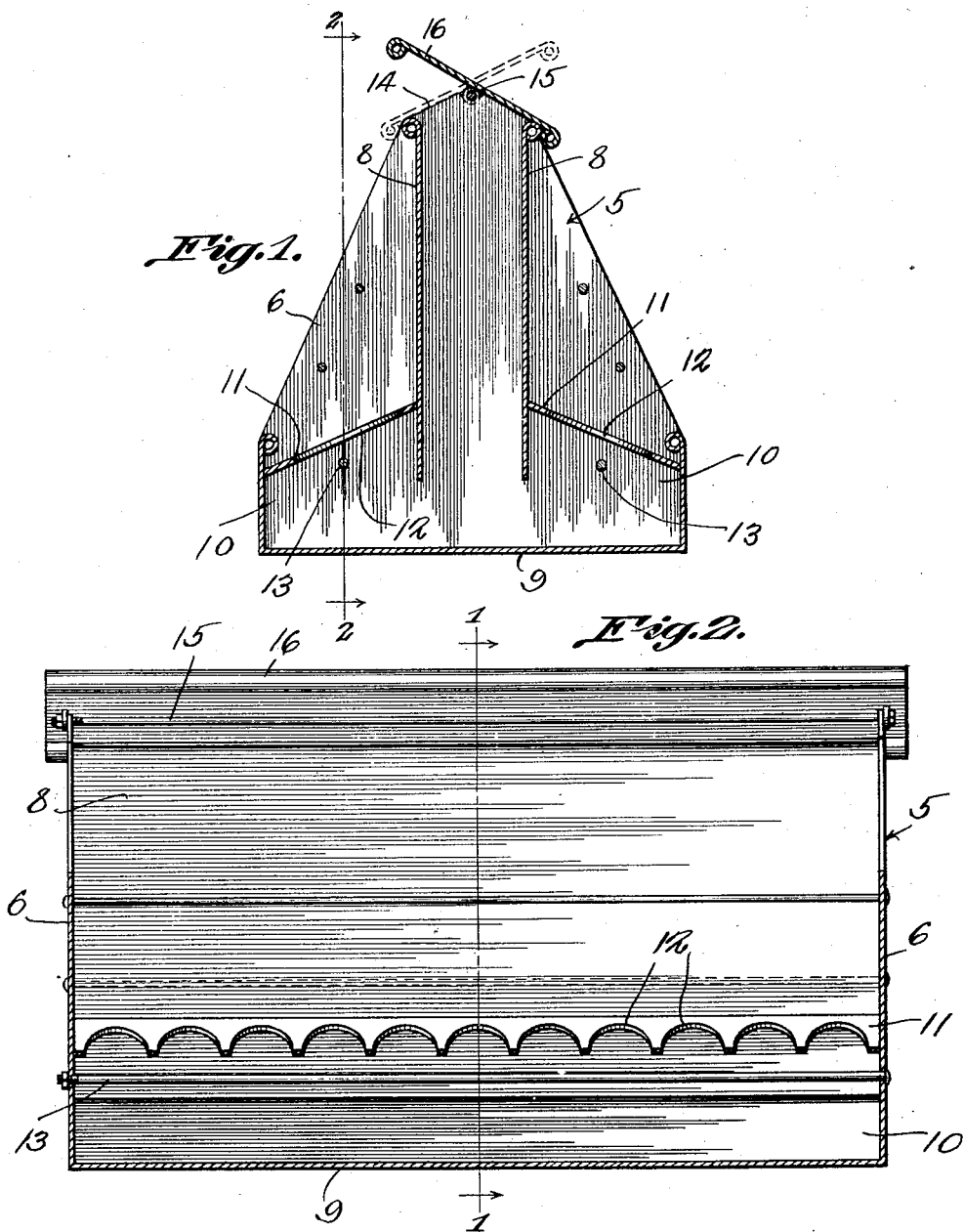
G. H. Samlow Inventor
By C. A. Snow & Co.
Attorneys.

Patented Jan. 14, 1930

1,743,571

UNITED STATES PATENT OFFICE

GEORGE H. SAMLOW, OF NAPOLEON, OHIO

FEEDER

Application filed September 26, 1928. Serial No. 308,382.

This invention relates to poultry feeders, and aims to provide a novel form of feeder so constructed that the poultry using the feeder cannot throw the grain from the feeder while eating therefrom, thereby eliminating waste of grain, and insuring clean dry feed at all times.

An important object of the invention is to provide a pivoted cover so constructed that it will swing downwardly under the weight of poultry attempting to roost thereon.

A further object of the invention is to provide a hopper having vertical walls to prevent the feed held therein from clogging to render the feeder inoperative.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a vertical sectional view taken on line 1—1 of Figure 2.

Figure 2 is a vertical sectional view taken on line 2—2 of Figure 1.

Referring to the drawing in detail, the feeder includes a body portion indicated generally by the reference character 5, which feeder includes end members 6 that have inclined side edges.

The end members 6 are connected by means of the vertical walls 8 which form the hopper, the walls being constructed of sheet metal material and secured to the end members 6 in any suitable and well known manner. These walls 8 extend downwardly, the lower ends thereof being spaced appreciable distances from the bottom 9 of the hopper so that ample space is provided for the grain held within the hopper, to pass therefrom.

The walls 8 also divide the feeder into lateral feeding compartments 10, each of which being covered by a plate 11 inclined and provided with a plurality of elongated openings 12 through which the poultry on feeding, pass their heads to gain access to the feeding compartments and grain held therein.

Disposed within the feeding compartments and arranged directly under the openings 12, are rods 13 which are supported in suitable openings formed in the end members 6, and it will be seen that due to these rods, the poultry using the feeder will be prevented from throwing the grain from the feeding compartments.

As clearly shown by Figure 1 of the drawing, the upper ends of the end members 6 are inclined as at 14, the same being provided with central notches for the reception of the rod 15 to which the cover 16 is connected, the edges of the cover being curled inwardly eliminating sharp edges.

Due to this construction, it will be seen that the cover is tilted at all times and that should poultry attempt to roost on the upper edge of the cover, the cover will immediately tilt downwardly throwing the poultry from the cover and maintaining a sanitary feeder at all times.

I claim:

1. A poultry feeder including a body portion, vertical walls spaced apart defining a hopper and feeding compartments, a cover for the hopper, said cover including a pivoted member normally held in an inclined position, said cover adapted to swing downwardly under the weight of poultry alighting thereon.

2. A poultry feeder including a body portion having end walls, formed with notches in the upper edges thereof, a hopper within the body portion, a cover including a plate, a rod connected to the plate and having its ends fitted in the notches to pivotally support the cover, and said cover adapted to swing downwardly under the weight of poultry alighting thereon.

In testimony that I claim the foregoing as my own, I have hereto affixed my signature.

GEORGE H. SAMLOW.